US00RE43219E

(19) United States
(12) Reissued Patent
Hirakata

(10) Patent Number: US RE43,219 E
(45) Date of Reissued Patent: Feb. 28, 2012

(54) FUEL CELL FUEL SUPPLY SYSTEM AND MOBILE BODY

(75) Inventor: Syuji Hirakata, Toyota (JP)

(73) Assignee: Toyota Jidosha Kabushiki Kaisha, Toyota-shi (JP)

(21) Appl. No.: 11/984,297

(22) Filed: Nov. 15, 2007

Related U.S. Patent Documents

Reissue of:
(64) Patent No.: 6,964,821
Issued: Nov. 15, 2005
Appl. No.: 10/296,232
PCT Filed: May 24, 2001
PCT No.: PCT/JP01/04379
§ 371 (c)(1),
(2), (4) Date: Dec. 4, 2002
PCT Pub. No.: WO01/95417
PCT Pub. Date: Dec. 13, 2001

(30) Foreign Application Priority Data

Jun. 8, 2000 (JP) ..... 2000-171345

(51) Int. Cl.
*H01M 8/04* (2006.01)
*B60L 11/18* (2006.01)

(52) U.S. Cl. ..... 429/428; 429/432; 429/443; 180/65.31

(58) Field of Classification Search ..... 429/428, 429/444, 443, 432; 180/65.31
See application file for complete search history.

(56) References Cited

U.S. PATENT DOCUMENTS 4,436,793 A * 3/1984 Adlhart ..... 429/421
5,512,787 A * 4/1996 Dederick ..... 290/4 R
6,346,340 B1 2/2002 Abersfelder et al. ..... 429/400
6,488,345 B1 * 12/2002 Woody et al. ..... 180/65.31 X
6,520,273 B1 * 2/2003 Ishikawa ..... 429/415

FOREIGN PATENT DOCUMENTS

| | | | |
|---|---|---|---|
| DE | 43 41 437 | | 1/1995 |
| DE | 43 41 437 | C1 | 1/1995 |
| DE | 196 30 842 | * | 11/1997 |
| DE | 197 57 054 | * | 6/1999 |
| EP | 320645 | * | 6/1989 |
| EP | 0 751 045 | A2 | 1/1997 |
| JP | 53-14343 | | 2/1978 |
| JP | 53-14434 | * | 2/1978 |
| JP | 58-64076 | * | 4/1983 |
| JP | 64-77878 | * | 3/1989 |
| JP | 4-61755 | | 2/1992 |
| JP | 7-192743 | * | 7/1995 |
| JP | 10-252567 | * | 9/1998 |

(Continued)

*Primary Examiner* — Stephen J. Kalafut
(74) *Attorney, Agent, or Firm* — Oblon, Spivak, McClelland, Maier & Neustadt, L.L.P.

(57) ABSTRACT

An electric vehicle with fuel cells mounted thereon has a fuel tank that stores a fuel therein, and a connector receptor that is connected to the fuel tank and is open to the surface of the vehicle body. A connector of a predetermined hydrogen supply device is fitted in and attached to the connector receptor, so that a supply of fuel is fed from the hydrogen supply device to the electric vehicle. The connector receptor is provided with a fuel lid for covering over the connector receptor. When it is determined that the fuel cells are in a working state, the fuel lid is not opened in response to input of an opening instruction of the fuel lid in the course of fuel supply. When it is determined that the fuel lid is open, on the other hand, operation of the fuel cells is not started in response to input of a starting instruction of the fuel cells in the electric vehicle. Such an arrangement enhances the safety of fuel supply to any system with fuel cells.

15 Claims, 7 Drawing Sheets

FOREIGN PATENT DOCUMENTS

| | | | |
|---|---|---|---|
| JP | 2000-88196 | * | 3/2000 |
| JP | 2001-105903 | * | 4/2001 |
| WO | 98/19960 | | 5/1998 |
| WO | WO-98/19960 | * | 5/1998 |
| WO | WO-98/56058 | * | 12/1998 |
| WO | WO-00/24608 | * | 5/2000 |

* cited by examiner

FUEL CELL FUEL SUPPLY SYSTEM AND MOBILE BODY

Matter enclosed in heavy brackets [ ] appears in the original patent but forms no part of this reissue specification; matter printed in italics indicates the additions made by reissue.

TECHNICAL FIELD

The present invention relates to a fuel supply system for fuel cells and a movable body. Specifically the present invention pertains to a fuel supply system for fuel cells, which functions to supply a fuel for the fuel cells or a source material used to generate the fuel for the fuel cells, as well as to a movable body.

BACKGROUND ART

A diversity of electric vehicles have been proposed, which utilize electrical energy output from fuel cells for the driving energy. Supply of a fuel, such as hydrogen, to the fuel cells is naturally required for power generation in the fuel cells. The electric vehicle of one known construction has hydrogen mounted thereon as the fuel for the fuel cells. The electric vehicle of another known construction has a source material, such as a hydrocarbon or a hydrocarbon compound, mounted thereon and reforms the source material to generate hydrogen gas and supply the hydrogen gas to the fuel cells.

One proposed arrangement to make hydrogen mounted on a vehicle as the fuel for fuel cells uses a storage tank including a hydrogen absorbing alloy on the vehicle and makes hydrogen absorbed by the hydrogen absorbing alloy as the fuel for fuel cells (for example, PATENT LAID-OPEN GAZETTE No. 2000-88196). This structure ensures the safety in storage of hydrogen on the vehicle as the movable body.

In the structure of utilizing the hydrogen absorbing alloy for storage of hydrogen on the vehicle, supply of hydrogen to the storage tank including the hydrogen absorbing alloy is required for a continuous drive of the vehicle. Sufficient safety is naturally an important factor in the course of supplying hydrogen under such conditions. The safety of fuel supply to a system with fuel cells has, however, not been discussed fully.

A fuel supply system for fuel cells and a movable body of the present invention are provided to solve the problems of the prior art technique and to enhance the safety of supply of a fuel, such as hydrogen, or its source material to any system with fuel cells.

DISCLOSURE OF THE INVENTION

The present invention is directed to a first fuel supply system for fuel cells, which functions to supply either one of a fuel for the fuel cells and a source material used to generate the fuel for the fuel cells. The first fuel supply system includes: the fuel cells; a storage module that stores either one of the fuel and the source material therein; a supply module that connects with the storage module to supply either one of the fuel and the source material to the storage module; a fuel cells working status specification module that determines whether or not the fuel cells are in a power generation state; and a supply prohibition module that, when the fuel cells working status specification module determines that the fuel cells are in the power generation state, prohibits a start of the supply of either one of the fuel and the source material from the supply module to the storage module.

The first fuel supply system for fuel cells according to the present invention has the fuel cells and the storage module, which stores either the fuel for the fuel cells or the source material used to generate the fuel for the fuel cells. The supply module is connected to the storage module, in order to supply the fuel or the source material to the storage module. In this process, it is determined whether or not the fuel cells are in the power generation state. When it is determined that the fuel cells are in the power generation state, the technique prohibits a start of the supply of the fuel or the source material from the supply module to the storage module.

The present invention is also directed to a first movable body with fuel cells mounted thereon, where the movable body utilizes electrical energy produced by the fuel cells as a driving energy source for movement. The first movable body includes: a storage module that stores therein either one of a fuel for the fuel cells and a source material used to generate the fuel for the fuel cells; a fuel cells working status specification module that determines whether or not the fuel cells are in a power generation state; and a supply prohibition module that, when the fuel cells working status specification module determines that the fuel cells are in the power generation state, prohibits a start of supply of either one of the fuel and the source material from a predetermined supply device, which is disposed outside the movable body for supplying either one of the fuel and the source material, to the storage module.

The first movable body of the present invention has the storage module that stores therein either the fuel for the fuel cells, which produce electrical energy as the driving energy for movement, or the source material used to generate the fuel for the fuel cells. It is determined whether or not the fuel cells are in the power generation state. When it is determined that the fuel cells are in the power generation state, the technique prohibits a start of supply of either the fuel or the source material from a predetermined supply device, which is disposed outside the movable body for supplying the fuel or the source material, to the storage module.

The present invention is further directed to a fuel supply control method that controls a process of supplying either one of a fuel for fuel cells and a source material used to generate the fuel for the fuel cells. The fuel supply control method includes the steps of: (a) determining whether or not the fuel cells are in a power generation state; and (b) when it is determined at the step (a) that the fuel cells are in the power generation state, prohibiting a start of the supply of either one of the fuel and the source material to a storage module, which is arranged with the fuel cells and stores either one of the fuel and the source material.

In the first fuel supply system for fuel cells, the first movable body, and the fuel supply control method of the present invention, when it is determined that the fuel cells are in the power generation state, the technique prohibits a start of the supply of either the fuel or the source material to the storage module. This arrangement desirably prevents supply of the fuel or the source material during power generation of the fuel cells and thus ensures the safety in power generation of the fuel cells as well as in supply of the fuel or the source material. Namely the fuel supply accompanied with connection of the storage module with the fuel supply device is not carried out simultaneously with power generation of the fuel cells. This ensures sufficient safety. The determination of whether or not the fuel cells are in the power generation state may be, for example, based on the actual power generation of the fuel cells or based on input of an instruction of starting operation of the fuel cells.

In accordance with one preferable application of the present invention, the first fuel supply system for fuel cells further includes an input module that receives an instruction of starting operation of the fuel cells and an instruction of stopping the operation of the fuel cells. The fuel cells working status specification module determines that the fuel cells are in the power generation state when the instruction of starting the operation of the fuel cells is given to the input module but no instruction of stopping the operation of the fuel cells is subsequently given to the input module.

In accordance with the corresponding application of the present invention, the first movable body includes an input module that receives an instruction of starting operation of the fuel cells and an instruction of stopping the operation of the fuel cells. The fuel cells working status specification module determines that the fuel cells are in the power generation state when the instruction of starting the operation of the fuel cells is given to the input module but no instruction of stopping the operation of the fuel cells is subsequently given to the input module.

This arrangement effectively prevents a start of supply of either the fuel or the source material in response to the instruction of starting the operation of the fuel cells, even prior to a sufficient output of electric power from the fuel cells, thus enhancing the safety.

In accordance with another preferable application of the present invention, the first fuel supply system for fuel cells further includes a voltage detection module that measures an output voltage of the fuel cells. The supply prohibition module prohibits the start of the supply of either one of the fuel and the source material when the output voltage measured by the voltage detection module is not less than a predetermined level, while the fuel cells working status specification module determines that the fuel cells are not in the power generation state.

In accordance with the corresponding application of the present invention, the first movable body further includes a voltage detection module that measures an output voltage of the fuel cells. The supply prohibition module prohibits the start of the supply of either one of the fuel and the source material when the output voltage measured by the voltage detection module is not less than a predetermined level, while the fuel cells working status specification module determines that the fuel cells are not in the power generation state.

A start of the supply of the fuel or the source material is prohibited when the output voltage from the fuel cells is not less than the predetermined level, even in the case where it is determined that the fuel cells are not in the power generation state. This arrangement desirably enhances the safety. In the fuel cells, even when the supplies of the fuel gas and the oxidizing gas are stopped in response to input of an instruction of stopping the operation of the fuel cells, the electrochemical reactions proceed until consumption of the existing supplies of the gases in the fuel cells. While it is determined that the fuel cells are not in the power generation state, in response to input of the instruction of stopping the operation of the fuel cells, the arrangement prohibits the start of the supply of either the fuel or the source material during the progress of the electrochemical reactions. This effectively prevents fuel supply while an undesired output voltage is produced.

It is preferable that the first movable body further includes: another energy source that is different from the fuel cells and generates driving energy for movement of the movable body; and an actuation prohibition decision module that determines whether or not actuation of another energy source is prohibited. The supply prohibition module prohibits the start of the supply of either one of the fuel and the source material to the storage module when the actuation prohibition decision module determines that actuation of another energy source is not prohibited, in addition to when the fuel cells working status specification module determines that the fuel cells are in the power generation state.

The arrangement effectively prevents the start of fuel supply when actuation of another energy source is not prohibited, that is, when there is a possibility that the movable body moves. This effectively enhances the safety in fuel supply.

The present invention is directed to a second fuel supply system for fuel cells, which functions to supply either one of a fuel for the fuel cells and a source material used to generate the fuel for the fuel cells. The second fuel supply system includes: the fuel cells; a storage module that stores either one of the fuel and the source material therein; a supply module that connects with the storage module to supply either one of the fuel and the source material to the storage module; a fuel filling status specification module that determines whether or not either one of the fuel and the source material is being supplied from the supply module to the storage module; and a power generation prohibition module that, when the fuel filling status specification module determines that either one of the fuel and the source material is being supplied, prohibits a start of power generation in the fuel cells.

The second fuel supply system for fuel cells according to the present invention has the fuel cells and the storage module, which stores either the fuel for the fuel cells or the source material used to generate the fuel for the fuel cells. The supply module is connected to the storage module, in order to supply the fuel or the source material to the storage module. It is determined whether or not the fuel or the source material is being supplied from the supply module to the storage module. When it is determined that the fuel or the source material is being supplied, the technique prohibits a start of power generation in the fuel cells.

The present invention is also directed to a second movable body with fuel cells mounted thereon, where the movable body utilizes electrical energy produced by the fuel cells as a driving energy source for movement. The second movable body includes: a storage module that stores therein either one of a fuel for the fuel cells and a source material used to generate the fuel for the fuel cells; a fuel filling status specification module that determines whether or not either one of the fuel and the source material is being supplied from a predetermined supply module, which is disposed outside the movable body for supplying either one of the fuel and the source material, to the storage module; and a power generation prohibition module that, when the fuel filling status specification module determines that either one of the fuel and the source material is being supplied, prohibits a start of power generation in the fuel cells.

The second movable body of the present invention has the storage module that stores therein either the fuel for the fuel cells, which produce electrical energy as the driving energy for movement, or the source material used to generate the fuel for the fuel cells. It is determined whether or not the fuel or the source material is being supplied from a predetermined supply module, which is disposed outside the movable body for supplying the fuel or the source material, to the storage module. When it is determined that the fuel or the source material is being supplied, the technique prohibits a start of power generation in the fuel cells.

The present invention is further directed to an operation control method that controls operation of fuel cells. The operation control method includes the steps of: (a) determining whether or not either one of a fuel for the fuel cells and a source material used to generate the fuel for the fuel cells is being supplied to a storage module, which is arranged with the fuel cells and stores either one of the fuel and the source material; and (b) when it is determined at the step (a) that either one of the fuel and the source material is being supplied, prohibiting a start of power generation in the fuel cells.

In the second fuel supply system for fuel cells, the second movable body, and the operation control method of the present invention, when it is determined that the fuel or the source material is being supplied to the storage module, the technique prohibits a start of power generation in the fuel cells. This arrangement desirably prevents operation of the fuel cells during supply of the fuel or the source material and thus ensures the safety in supply of the fuel or the source material. Namely the fuel supply accompanied with connection of the storage module with the fuel supply device is not carried out simultaneously with power generation of the fuel cells. This ensures sufficient safety. The determination of whether or not the fuel or the source material is being supplied may be, for example, based on the actual supply of the fuel or the source material to the storage module or based on input of a predetermined instruction, which is to be given prior to the start of the supply of the fuel or the source material.

In accordance with one preferable application of the present invention, the second movable body further has a movement prohibition module that prohibits movement of the movable body when the fuel filling status specification module determines that either one of the fuel and the source material is being supplied.

This arrangement effectively prevents movement of the movable body in the course of supply of either the fuel or the source material, thus enhancing the safety in fuel supply.

In the first and the second fuel supply systems for fuel cells according to the present invention, the storage module may store hydrogen as the fuel for the fuel cells and include a hydrogen absorbing alloy for the storage of hydrogen.

In the first and the second movable bodies of the present invention, the storage module may store hydrogen as the fuel for the fuel cells and include a hydrogen absorbing alloy for the storage of hydrogen.

In the first and the second fuel supply systems for fuel cells according to the present invention, the fuel cells and the storage module may be mounted on a movable body, which utilize electrical energy produced by the fuel cells as driving energy for movement.

BEST MODES OF CARRYING OUT THE INVENTION

In order to clarify the construction and the functions of the present invention, one mode of carrying out the present invention is described below in the following sequence as a preferred embodiment:

1. General Construction of Electric Vehicle
2. Structure Related to Supply of Hydrogen
3. Control in Process of Hydrogen Supply
4. Another Construction of Electric Vehicle

(1) General Construction of Electric Vehicle

Figure 1:
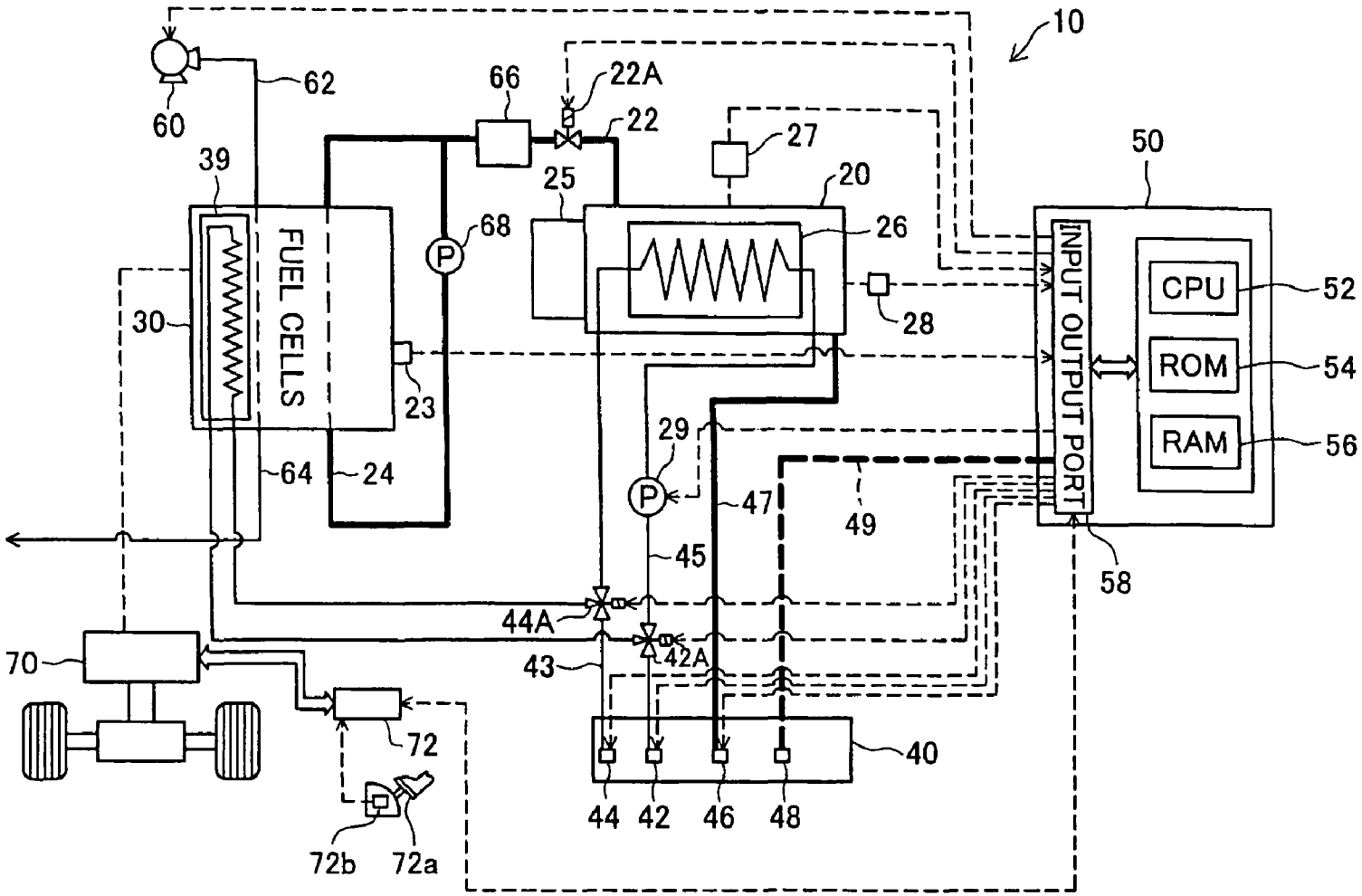
FIG. 1 illustrates the general construction of an electric vehicle 10.

The construction of an electric vehicle is described first as one embodiment of the present invention. FIG. 1 illustrates the general construction of an electric vehicle 10 in one embodiment of the present invention. The electric vehicle 10 has a fuel tank 20, a stack of fuel cells 30, a connector receptor 40, and a controller 50, in addition to a predetermined vehicle structure including a motor 70. The following describes the respective constituents of the electric vehicle 10.

The fuel tank 20 stores externally supplied hydrogen gas, and feeds the hydrogen gas to the stack of fuel cells 30 according to the requirements. The fuel tank 20 includes a solid metal hydride or a hydrogen absorbing alloy, which absorbs hydrogen therein for storage of hydrogen. The hydrogen absorbing alloys have varying weights, varying hydrogen storage capacities, varying quantities of heat produced in the course of hydrogen absorption, varying quantities of heat required for release of hydrogen, and varying pressures required for handling. The hydrogen absorbing alloys that are capable of storing and releasing hydrogen at relatively low temperatures (not higher than 100° C.) and at relatively low pressures (not higher than 10 kg/cm$^2$)), for example, titanium alloys and rare earth alloys, are preferably applicable for automobile use.

The fuel tank 20 is connected with a hydrogen gas inlet conduit 47, through which a supply of hydrogen gas is fed into the fuel tank 20, and a fuel supply conduit 22, through which a supply of hydrogen gas taken out of the hydrogen absorbing alloy in the fuel tank 20 is fed into the stack of fuel cells 30. As discussed later, the electric vehicle 10 receives a supply of hydrogen gas fed from a predetermined external hydrogen supply device. The hydrogen gas fed from the hydrogen supply device is led into the fuel tank 20 via the connector receptor 40 and the hydrogen gas inlet conduit 47, and is absorbed by the hydrogen absorbing alloy to be stored in the fuel tank 20. The hydrogen gas released from the hydrogen absorbing alloy in the fuel tank 20 is supplied as the fuel gas to the stack of fuel cells 30 via the fuel supply conduit 22.

The fuel supply conduit 22 is provided with a valve 22A. The valve 22A is connected with the controller 50, which regulates the on-off state of the valve 22A. Regulating the on-off state of the valve 22A varies the quantity of the fuel gas fed to the stack of fuel cells 30 and thereby controls the quantity of power generation by the stack of fuel cells 30.

A humidifier 66 is disposed in the fuel supply conduit 22 to moisten the fuel gas passing through the fuel supply conduit 22. Humidification of the fuel gas by the humidifier 66 prevents a polymer electrolyte membrane included in the fuel cells from being dried. The humidifier 66 of the embodiment utilizes a porous membrane to moisten the fuel gas. The porous membrane separates the fuel gas fed from the fuel tank 20 from hot water under a predetermined pressure, so that a preset quantity of water vapor is supplied from the hot water to the fuel gas via the porous membrane. The hot water used for humidification is, for example, cooling water in the stack of fuel cells 30. The stack of fuel cells 30 of the embodiment are polymer electrolyte fuel cells as described later. In order to keep the driving temperature in a desired temperature range of 80 to 100° C., cooling water is circulated around the fuel cells 30. The hot water heated in the stack of fuel cells 30 may be utilized to moisten the fuel gas.

The hydrogen absorbing alloy included in the fuel tank 20 absorbs hydrogen for storage of hydrogen in the fuel tank 20. The process of hydrogen absorption is exothermic. The fuel tank 20 is accordingly provided with a heat exchange module 26 as the structure of discharging heat produced in the process of hydrogen storage. The heat exchange module 26 is defined by a cooling water conduit 45, through which cooling water is circulated. The cooling water conduit 45 has an opening end at the connector receptor 40. Namely the opening end of the cooling water conduit 45 forms a water flow path joint 42 at the connector receptor 40. The cooling water conduit 45, which defines the heat exchange module 26 of the fuel tank 20, leads to a cooling water conduit 43. The cooling water conduit 43 forms a water flow path joint 44 at the connector receptor 40. In the process of hydrogen absorption into the hydrogen absorbing alloy in the fuel tank 20, the flow of cooling water is led into the heat exchange module 26 via the water flow path joint 42 and carries out heat exchange with the hydrogen absorbing alloy to be warmed up by the heat produced in the process of hydrogen absorption. The warmed-up cooling water is discharged outside via the water flow path joint 44. Elimination of heat from the fuel tank 20 in this manner accelerates the action of hydrogen absorption and prevents the fuel tank 20 from being warmed up to an undesired level.

In the electric vehicle 10, the cooling water conduits 45 and 43 are branched off at specific positions. The branched flow paths are laid in the stack of fuel cells 30 to define a heat exchange module 39 in the stack of fuel cells 30. The branched flow paths are connected to each other in the heat exchange module 39. Changeover valves for changing over the flow path are provided at the specific branch positions of the cooling water conduits 45 and 43 off to the heat exchange module 39. A changeover valve 42A is disposed at the branch position of the cooling water conduit 45, and a changeover valve 44A is disposed at the branch position of the cooling water conduit 43. These changeover valves 42A and 44A are connected to the controller 50, which outputs driving signals to change over the flow path. In the course of hydrogen supply from an external hydrogen supply device connected via the connector receptor 40 to the fuel tank 20, the changeover valves 42A and 44A are controlled to close the flow path to the heat exchange module 39 and to circulate the flow of cooling water between the external hydrogen supply device and the heat exchange module 26.

While the electric vehicle 10 runs with hydrogen in the fuel tank 20, the state of the changeover valves 42A and 44A is controlled to make the flow path of the heat exchange module 26 linked with the flow path of the heat exchange module 39. In this case, the flow of cooling water is circulated between the heat exchange module 26 in the fuel tank 20 and the heat exchange module 39 in the stack of fuel cells 30. The electric vehicle 10 of the embodiment having the above construction enables hydrogen to be taken out of the hydrogen absorbing alloy by utilizing the heat produced in the stack of fuel cells 30. In the process of power generation by the stack of fuel cells 30, the energy not converted into electrical energy is released as thermal energy to produce heat. The flow of cooling water passing through the heat exchange module 39 carries out heat exchange with the stack of fuel cells 30, so as to be warmed up while keeping the driving temperature of the fuel cells stack 30 in a temperature range of 80 to 100° C. Heat supply is required to take out hydrogen absorbed by the hydrogen absorbing alloy in the fuel tank 20. In the structure of this embodiment, the cooling water warmed up by the heat exchange module 39 is led into the heat exchange module 26. This gives the required heat to the fuel tank 20 to allow release of hydrogen from the hydrogen absorbing alloy, while cooling down the flow of cooling water passing through the heat exchange module 26. Circulation of cooling water between the heat exchange module 39 and the heat exchange module 26 enables the heat produced in the stack of fuel cells 30 to be utilized in the fuel tank 20.

A pump 29 is disposed in the cooling water conduit 45. The pump 29 is under control of the controller 50 to circulate the flow of cooling water in the cooling water conduit 45 and a flow path connecting therewith. In the structure of the embodiment, the flow of cooling water is circulated in the cooling water conduit 45 to cool the fuel tank 20 down in the process of absorption of hydrogen by the hydrogen absorbing alloy. The cooling-down action of the fuel tank 20 may be implemented by circulation of a fluid other than water or by air cooling.

In the electric vehicle 10 of the embodiment, the fuel tank 20 is provided with a heating unit 25. The heating unit 25 is used to heat the fuel tank 20 up. As discussed above, in the electric vehicle 10, the heat produced in the stack of fuel cells 30 is utilized for release of hydrogen stored in the hydrogen absorbing alloy included in the fuel tank 20. The heating unit 25 functions to heat the fuel tank 20 up in the case of transmission of insufficient heat from the stack of fuel cells 30 via the flow of cooling water or in the case of requirement of heat supplement to the fuel tank 20 when the stack of fuel cells 30 has not yet been warmed up sufficiently, for example, at the time of starting the electric vehicle 10. The heating unit 25 is, for example, a heater and accomplishes heating by utilizing electric power supplied from a secondary battery mounted on the electric vehicle as discussed later. The heating unit 25 is connected to the controller 50. The controller 50 controls the heating state of the heating unit 25, which accordingly ensures production of a required quantity of heat for taking out a desired amount of hydrogen. The heating unit 25 may alternatively utilize a combustion reaction to produce heat. In this case, hydrogen taken out of the fuel tank 20 or fuel gas exhaust discharged from the stack of fuel cells 30 as discussed later may be used for the fuel of the combustion.

The fuel tank 20 is further provided with a hydrogen remaining quantity monitor 27, which accumulates a quantity of hydrogen supplied from the fuel tank 20 to the stack of fuel cells 30 and its supply time. The controller 50 computes the remaining quantity of hydrogen in the fuel tank 20 based on results of the accumulation. The quantity of hydrogen supplied from the fuel tank 20 to the stack of fuel cells 30 may be obtained by directly measuring the flow of hydrogen gas passing through the fuel supply conduit 22 or by estimating indirectly from the output of the fuel cells stack 30. When it is determined that the remaining quantity of hydrogen in the fuel tank 20 is equal to or below a preset level in response to a signal from the hydrogen remaining quantity monitor 27, the controller 50 outputs a signal to a predetermined alarm unit, which is recognizable by a user of the vehicle. Notifying the user of the less remaining quantity of hydrogen prompts the user to feed a supply of hydrogen.

The fuel tank 20 is also provided with a hydrogen fill monitor 28, which is constructed as a pressure sensor and detects absorption of a sufficient quantity of hydrogen by the hydrogen absorbing alloy included in the fuel tank 20. At the time of filling hydrogen, that is, in the process of absorption of hydrogen by the hydrogen absorbing alloy, the inside of the fuel tank 20 is pressurized to a preset level by an external supply of hydrogen. The inner pressure of the fuel tank 20 rises when the hydrogen absorbing alloy absorbs a sufficient quantity of hydrogen and the rate of hydrogen absorption is lowered. The pressure sensor disposed in the fuel tank 20 detects an increase in inner pressure, which shows that the hydrogen absorbing alloy has been filled with the sufficient quantity of hydrogen. The hydrogen fill monitor 28 is connected to the controller 50, which receives a signal representing conclusion of the hydrogen filling action.

The fuel cells 30 are polymer electrolyte fuel cells and form a stack structure including a plurality of constitutional units or unit cells 38 laid one upon another. In the stack of fuel cells 30, the anode receives a supply of fuel gas, whereas the cathode receives a supply of oxidizing gas containing oxygen. An electromotive force is then produced through electrochemical reactions shown below:

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

Figure 2:
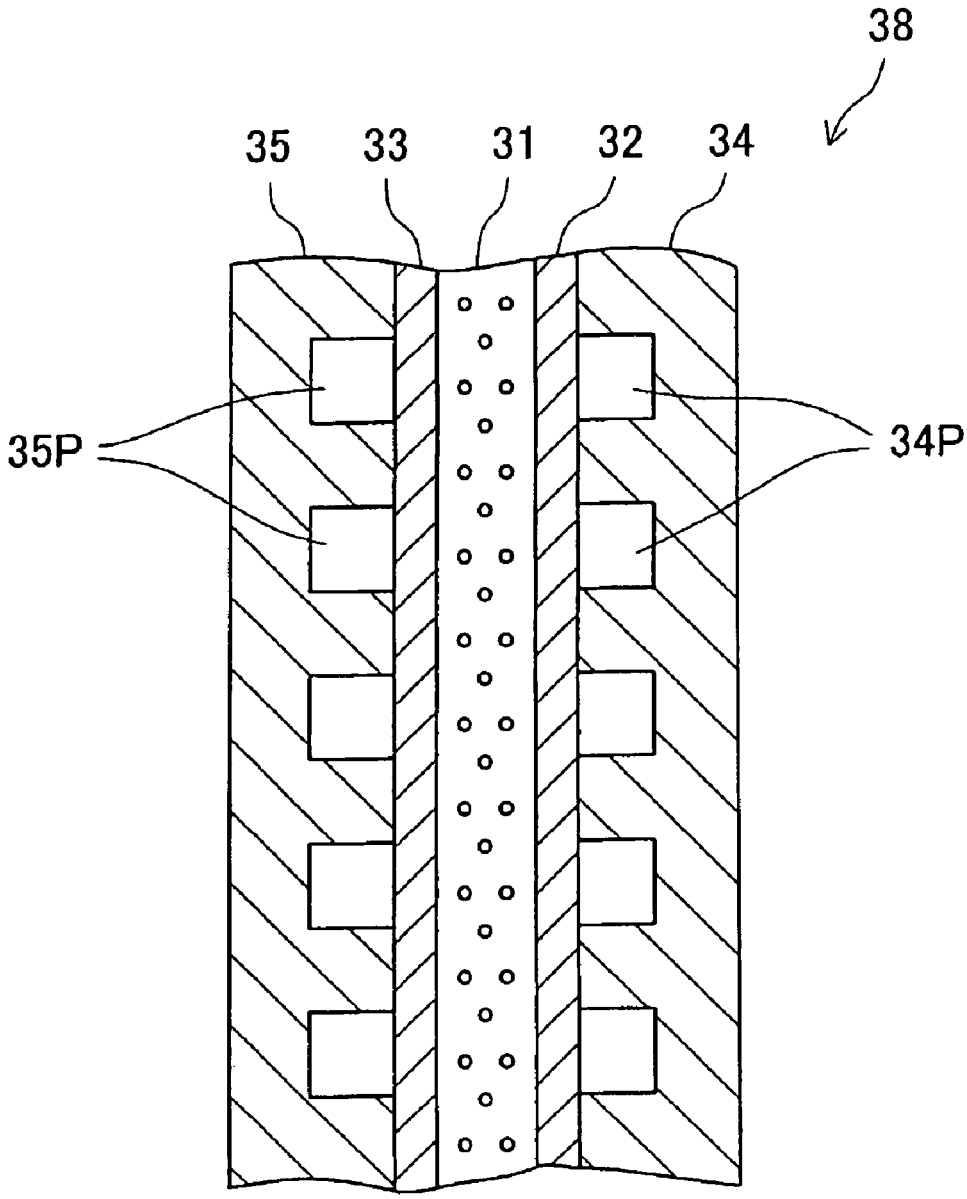
FIG. 2 is a sectional view illustrating the structure of a unit cell 38.

Equation (1), Equation (2), and Equation (3) respectively denote a reaction at the anode of the fuel cells, a reaction at the cathode of the fuel cells, and a total reaction in the fuel cells. FIG. 2 is a sectional view illustrating the structure of the unit cell 38, which is a constitutional unit of the fuel cells stack 30. The unit cell 38 includes an electrolyte membrane 31, an anode 32, a cathode 33, and a pair of separators 34 and 35.

The anode 32 and the cathode 33 are gas diffusion electrodes and are arranged across the electrolyte membrane 31 to form a sandwich-like structure. The separators 34 and 35 are arranged across this sandwich-like structure and are combined with the anode 32 and the cathode 33 to form flow paths of the fuel gas and the oxidizing gas. A flow path of fuel gas 34P is defined by the anode 32 and the separator 34, whereas a flow path of oxidizing gas 35P is defined by the cathode 33 and the separator 35. Each of the separators 34 and 35 actually has ribs on both faces thereof, although the flow path is formed only on its single face in the illustration of FIG. 2. Namely one face of each separator 34 or 35 is combined with the anode 32 to form the flow path of fuel gas 34P, whereas the other face of the separator 34 or 35 is combined with the cathode 33 to form the flow path of oxidizing gas 35P. The separators 34 and 35 are combined with the adjoining gas diffusion electrodes to define the gas flow paths, while functioning to separate the flow of fuel gas from the flow of oxidizing gas in each pair of adjoining unit cells.

The electrolyte membrane 31 is a proton-conductive ion exchange membrane composed of a solid polymer material, for example, a fluororesin, and has favorable electrical conductivity in the wet state. In this embodiment, a Nafion membrane (manufactured by du Pont) is applied for the electrolyte membrane 31. Platinum or a platinum-containing alloy as a catalyst is applied on the surface of the electrolyte membrane 31. The method of applying the catalyst adopted in this embodiment prepares carbon powder with platinum or a platinum-containing alloy carried thereon, makes the carbon powder with the catalyst carried thereon dispersed in an appropriate organic solvent, adds a suitable quantity of an electrolyte solution (for example, Nafion solution manufactured by Aldrich Chemical Company Inc.,) to the dispersion to yield a paste, and screen prints the paste on the electrolyte membrane 31. Another applicable method forms a paste containing the carbon powder with the catalyst carried thereon to a sheet and presses the sheet on the electrolyte membrane 31. The platinum or another catalyst may be applied on, instead of the electrolyte membrane 31, the anode 32 and the cathode 33, which are in contact with the electrolyte membrane 31.

The anode 32 and the cathode 33 are both made of carbon cloth woven of carbon fiber threads. Although the anode 32 and the cathode 33 are made of carbon cloth in this embodiment, the anode 32 and the cathode 33 may be made of carbon paper or carbon felt of carbon fibers.

The separators 34 and 35 are made of a gas-impermeable conductive material, for example, gas-impermeable dense carbon obtained by compression of carbon. Each of the separators 34 and 35 has multiple ribs arranged in parallel on both faces thereof, and is combined with the surface of the anode 32 in one unit cell to form the flow path of fuel gas 34P while being combined with the surface of the cathode 33 in an adjoining unit cell to form the flow path of oxidizing gas 35P. The multiple ribs formed on both faces of each separator may not be parallel to each other but may have a predetermined angle, such as at right angles. The ribs are not restricted to the parallel grooves but may have any suitable shape to feed a supply of fuel gas or oxidizing gas to the gas diffusion electrode.

The unit cell 38 or the basic constituent of the fuel cells stack 30 has the above structure. In the actual assembly of the fuel cells stack 30, a plurality of (100 in this embodiment) the unit cells 38, each including the separator 34, the anode 32, the electrolyte membrane 31, the cathode 33, and the separator 35 in this order, are laid one upon another to form a cell laminate. A pair of collectors made of dense carbon or copper plates are arranged across the cell laminate. This completes the stack structure. In this embodiment, the fuel cells 30 are polymer electrolyte fuel cells. The technique of the present invention is also applicable to other types of fuel cells, for example, phosphoric acid fuel cells, mounted on an electric vehicle.

As shown in FIG. 1, in the electric vehicle 10, hydrogen absorbed by the hydrogen absorbing alloy included in the fuel tank 20 is taken out of the hydrogen absorbing alloy and is supplied as the fuel gas to the anode of the fuel cells 30 via the fuel supply conduit 22 to be subjected to the electrochemical reaction in the flow path of fuel gas 34P. The proton produced by the reaction expressed by Equation (1) on the anode side of the electrolyte membrane 31 is hydrated and shifted to the cathode side. Water is accordingly consumed on the cathode side. As mentioned previously, humidification of the fuel gas supplements the water content insufficient in the electrolyte membrane 31. The fuel gas exhaust after the electrochemical reaction is discharged from the flow path of fuel gas 34P to a fuel discharge conduit 24. The fuel discharge conduit 24 is linked with the fuel supply conduit 22, and the fuel gas exhaust is again supplied as the fuel gas to the fuel cells 30. A pump 68 is disposed in the fuel discharge conduit 24 to pressurize the fuel gas exhaust and feed the pressurized fuel gas exhaust to the fuel supply conduit 22.

A supply of the air as the oxidizing gas is fed to the flow path of oxidizing gas 35P via an oxidizing gas supply conduit 62. A compressor 60 is disposed in the oxidizing gas supply conduit 62 to pressurize an external supply of the air and feed the pressurized air to the stack of fuel cells 30. The oxidizing gas exhaust after the electrochemical reaction is discharged outside from the flow path of oxidizing gas 35P via an oxidizing gas discharge conduit 64.

A voltage sensor 23 is attached to the stack of fuel cells 30 to measure an output voltage of the fuel cells 30 and give information on the observed output voltage to the controller 50 as discussed later.

The controller 50 is constructed as a microcomputer-based logic circuit and includes a CPU 52, a ROM 54, a RAM 56, and an input-output port 58. The CPU 52 carries out predetermined operations according to preset control programs.

Control programs and control data required for execution of diverse operations by the CPU 52 are stored in advance in the ROM 54. Various data required for execution of the diverse operations by the CPU 52 are temporarily written in and read from the RAM 56. The input-output port 58 receives a signal from the hydrogen supply device and outputs driving signals to the compressor 60 and other relevant units involved in operation of the fuel cells 30 according to results of the operations by the CPU 52, so as to control the driving state of the respective units of the electric vehicle 10.

The connector receptor 40 is arranged at a predetermined position on the outer surface of the electric vehicle 10 and has a connectable structure to a connector of the predetermined external hydrogen supply device. The connector receptor 40 has a hydrogen flow path joint element 46, a connection terminal 48, and water flow path joint elements 42 and 44. The hydrogen flow path joint element 46 forms an end structure of the hydrogen gas inlet conduit 47, and the connection terminal 48 forms an end structure of a signal line 49 connecting with the controller 50. The water flow path joint elements 42 and 44 respectively form end structures of the cooling water conduits 45 and 43. The connector of the hydrogen supply device is linked with the connector receptor 40, and the respective joint elements of the connector receptor 40 are connected to mating joint elements of the connector. This ensures circulation of hydrogen gas and cooling water between the hydrogen supply device and the electric vehicle 10. The linkage of the connector with the connector receptor 40 and connection of the connection terminal 48 with a mating terminal of the hydrogen supply device ensure transmission of information regarding the control executed by the controller 50 between the hydrogen supply device and the electric vehicle 10. Each of the hydrogen flow path joint element 46 and the water flow path joint elements 42 and 44 is provided with a solenoid valve. These solenoid valves are connected to the controller 50 and are opened and closed in response to driving signals output from the controller 50. The closed state of these solenoid valves causes the electric vehicle 10 to stop the circulation of hydrogen gas and cooling water between the electric vehicle 10 and the hydrogen supply device.

The electric power produced by the electrochemical reactions in the stack of fuel cells 30 is supplied to the motor 70, which accordingly produces a rotational driving force. The rotational driving force is transmitted to front wheels and/or rear wheels of the electric vehicle 10 via an axle of the vehicle 10 and functions as power for driving the vehicle. The motor 70 is under control of a control unit 72. The control unit 72 is connected with an accelerator pedal position sensor 72b, which measures a step-on amount of an accelerator pedal 72a. The control unit 72 is also connected with the controller 50 to transmit information regarding actuation of the motor 70 to and from the controller 50.

The electric vehicle 10 has a non-illustrated secondary battery, which supplements electric power given to the motor 70 to ensure a higher driving force in the case of increased loading, for example, when the electric vehicle 10 climbs up a slope or runs at high speed. The secondary battery functions as an energy source for supplying electric power required for the respective units of the electric vehicle 10, when no power generation is carried out by the fuel cells 30 or when electric power is required for actuation of the controller 50 and circulation of the cooling water through the cooling water conduit 45 in the process of supplying hydrogen to the fuel tank 20 of the electric vehicle 10.

(2) Structure Related to Supply of Hydrogen

Figure 3:
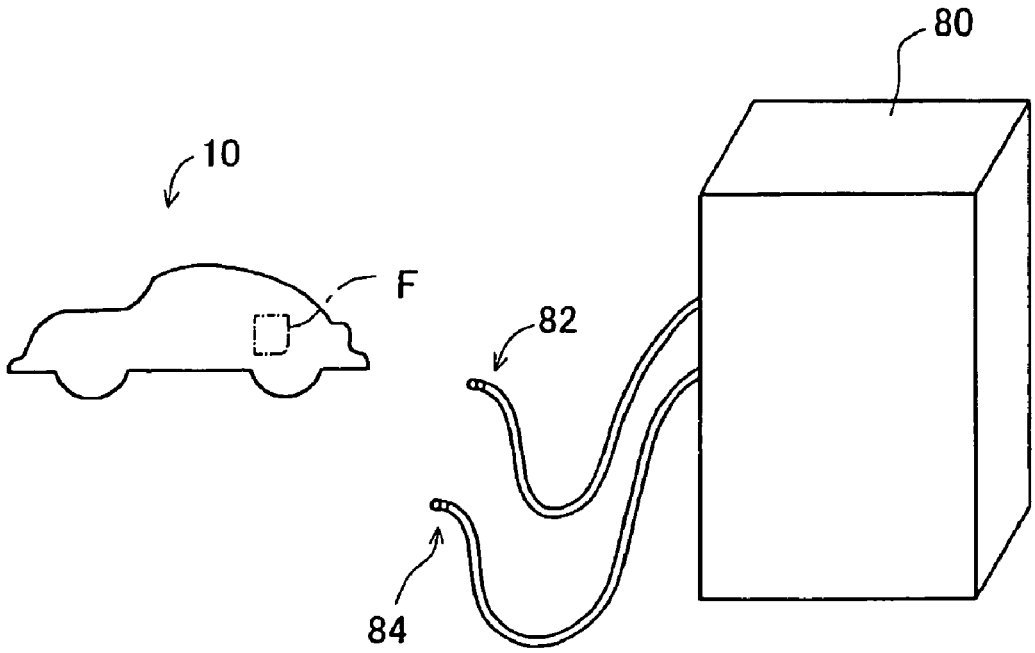
FIG. 3 shows the electric vehicle 10 and an external hydrogen supply device.
Figure 4:
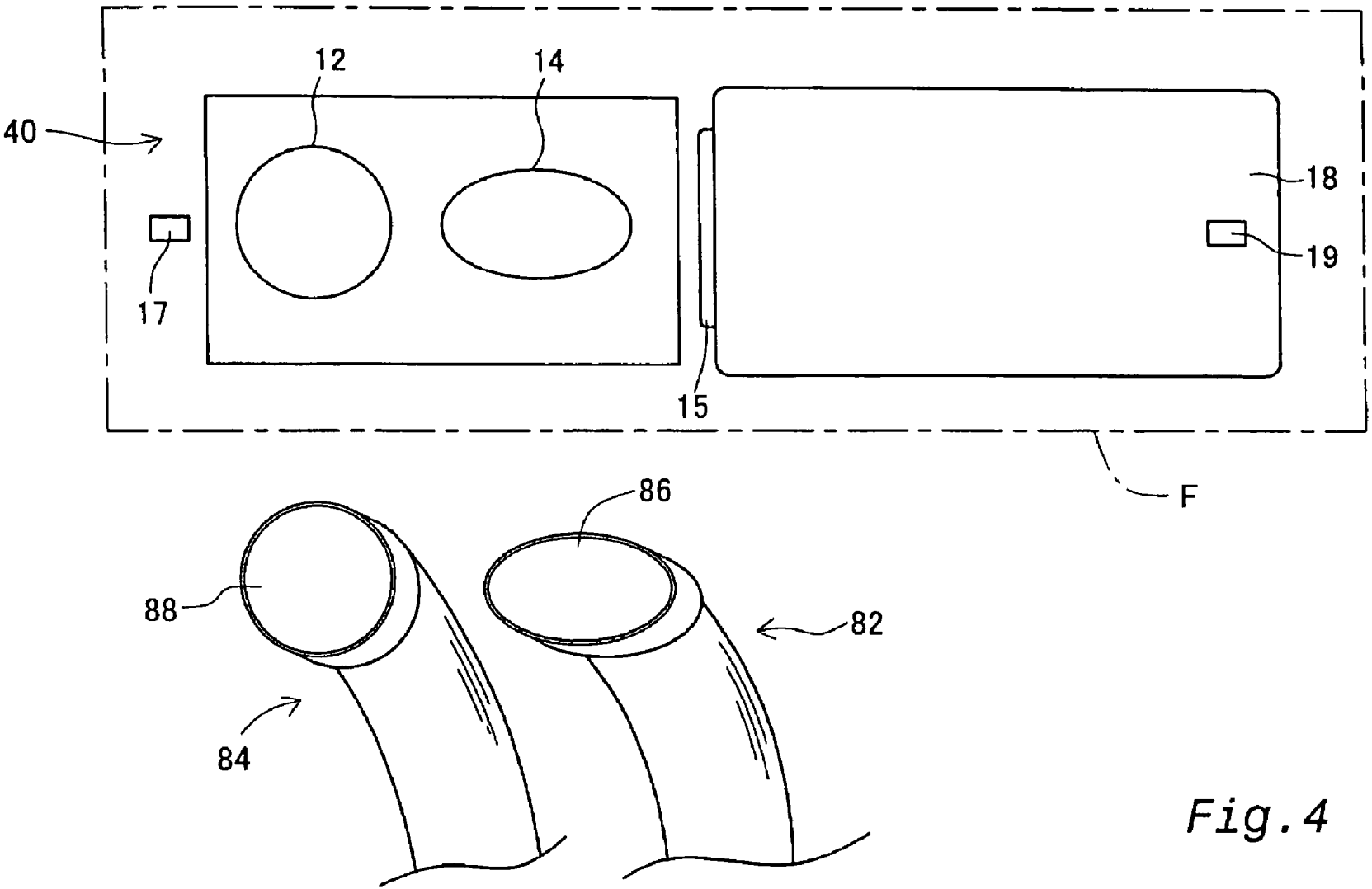
FIG. 4 shows the structure of a connector receptor 40.

The electric vehicle 10 of the embodiment has the construction discussed above. The following describes the details of the structure involved in the action of filling hydrogen in the fuel tank 20 of the electric vehicle 10. FIG. 3 shows the electric vehicle 10 and a hydrogen supply device 80 used to supply hydrogen to the electric vehicle 10. The connector receptor 40 discussed above is arranged at the predetermined position on the outer surface of the body of the electric vehicle 10. In the illustration of FIG. 3, an area F represents the predetermined position, at which the connector receptor 40 is arranged. FIG. 4 shows the connector receptor 40 in the area F on the outer surface of the vehicle. The hydrogen supply device 80 used to supply hydrogen to the vehicle has two tubular structures extended outside, that is, a hydrogen supply unit 82 and a cooling water supply unit 84, which are capable of feeding supplies of hydrogen gas and cooling water to the electric vehicle 10. The hydrogen supply unit 82 and the cooling water supply unit 84 are illustrated in FIG. 4. The hydrogen supply unit 82 of the hydrogen supply device 80 has a first connector 86 on one end thereof. The cooling water supply unit 84 of the hydrogen supply device 80 has a second connector 88 on one end thereof.

As illustrated in FIG. 4, the connector receptor 40 has a hydrogen inlet 14 and a cooling water inlet 12. The hydrogen inlet 14 open to the outer surface of the body of the electric vehicle 10 has the hydrogen flow path joint element 46 (not shown in FIG. 4), and is connected to the fuel tank 20 via the hydrogen gas inlet conduit 47 laid inside the electric vehicle 10. The hydrogen inlet 14 also has the connection terminal 48 (not shown in FIG. 4) connecting with the controller 50. The cooling water inlet 12 open to the outer surface of the body of the electric vehicle 10 has the water flow path joint elements 42 and 44 (not shown in FIG. 4) connecting with the heat exchange module 26 via the cooling water conduits 43 and 45. The hydrogen inlet 14 of the connector receptor 40 has a structure to receive the first connector 86 fitted therein for attachment. The cooling water inlet 12 of the connector receptor 40 has a structure to receive the second connector 88 fitted therein for attachment.

Figure 5:
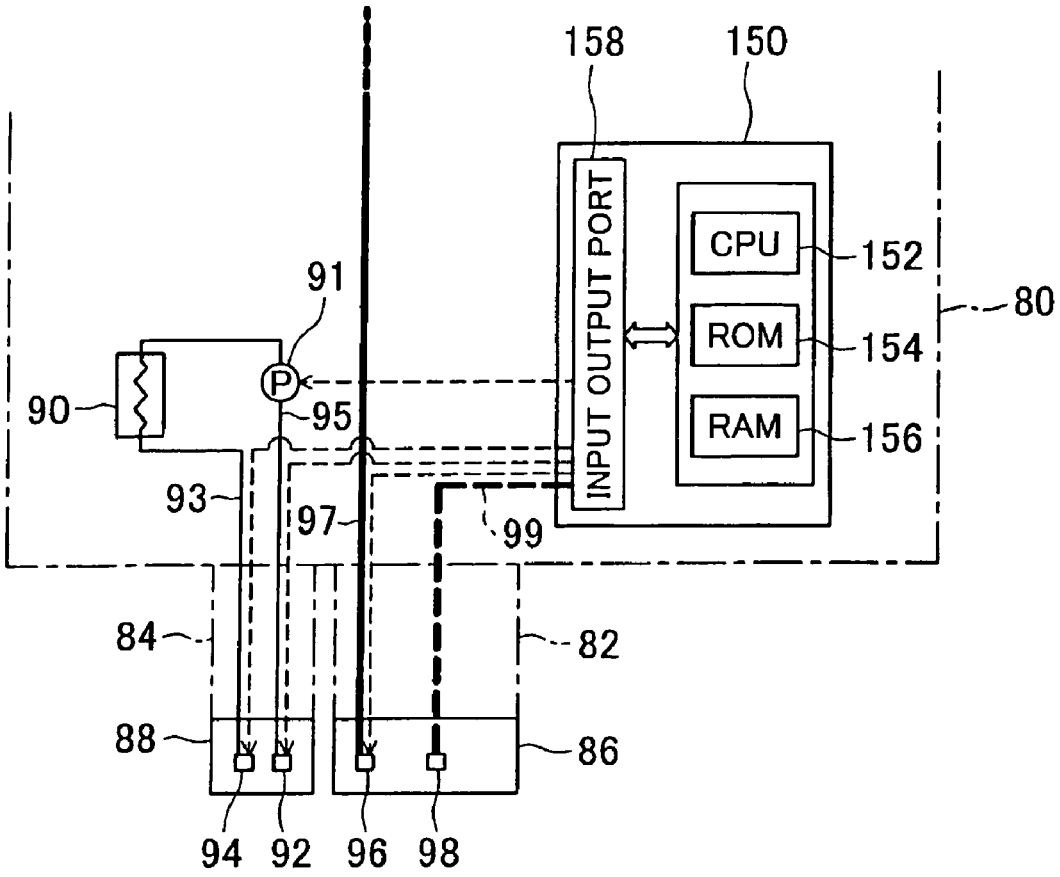
FIG. 5 shows the construction of a main part of the hydrogen supply device 80.

FIG. 5 shows the construction of a main part of the hydrogen supply device 80. The first connector 86 has a hydrogen flow path joint element 96 and a connection terminal 98. When the first connector 86 is fitted in and attached to the hydrogen inlet 14, the hydrogen flow path joint element 96 is joined with the mating hydrogen flow path joint element 46 of the electric vehicle 10 and the connection terminal 98 is joined with the mating connection terminal 48 of the electric vehicle 10. The second connector 88 has water flow path joint elements 92 and 94. When the second connector 88 is fitted in and attached to the cooling water inlet 12, the water flow path joint element 92 is joined with the mating water flow path joint element 42 of the electric vehicle 10 and the water flow path joint element 94 is joined with the mating water flow path joint element 44 of the electric vehicle 10.

One end of a hydrogen gas inlet conduit 97 laid in the hydrogen supply device 80 is open to the hydrogen flow path joint element 96 of the first connector 86. The other end of the hydrogen gas inlet conduit 97 is linked with a non-illustrated hydrogen reservoir. The hydrogen supply device 80 of the embodiment has the hydrogen reservoir, which stores therein a sufficient quantity of hydrogen. Hydrogen stored in the hydrogen reservoir is supplied to the electric vehicle via the first connector 86 and the connector receptor 40. In this embodiment, the hydrogen supply device is a device that stores a sufficient quantity of hydrogen and supplies the hydrogen stored therein to outside. The hydrogen supply device may alternatively be a device that reforms a source material, such as a hydrocarbon or a hydrocarbon compound to produce a hydrogen-containing gas, extracts hydrogen from the produced hydrogen-containing gas, and supplies the extracted hydrogen to outside.

Cooling water conduits 95 and 93 laid in the hydrogen supply device 80 are respectively open to the water flow path joint elements 92 and 94 of the second connector 88. The cooling water conduits 95 and 93 are connected with each other in a heat exchange module 90. The cooling water conduit 95 is provided with a pump 91 for circulation of the cooling water. The heat exchange module 90 has a radiator structure and cools down the flow of cooling water, which is led by the cooling water conduit and passes through the heat exchange module 80. The fuel tank 20 is cooled down, as the operation of supplying hydrogen to the fuel tank 20 of the electric vehicle 10 is exothermic. The heat exchange module 90 and the pump 91 in the hydrogen supply device 80 function to decrease the temperature of the cooling water, which has been heated up in the course of cooling down the fuel tank 20.

The hydrogen supply device 80 also has a controller 150. Like the controller 50 of the electric vehicle 10, the controller 150 includes a CPU 152, a ROM 154, a RAM 156, and an input output port 158. The connection terminal 98 of the first connector 86 is linked with the controller 150 via a signal line 99. When the first connector 86 is attached to the hydrogen inlet 14, the controller 150 can transmit information to and from the controller 50 of the electric vehicle 10. The controller 150 also connects with the pump 91 to output a driving signal to the pump 91. The hydrogen flow path joint element 96 and the water flow path joint elements 92 and 94 are respectively provided with solenoid valves. These solenoid valves are connected to the controller 150 and are opened and closed in response to driving signals output from the controller 150. The closed state of these solenoid valves causes the hydrogen supply device 80 to stop the circulation of hydrogen gas and cooling water between the electric vehicle 10 and the hydrogen supply device 80.

The connector receptor 40 of the electric vehicle 10 is attached to the outer surface of the vehicle body via a hinge 15 in a freely opening and closing manner. The connector receptor 40 has a fuel lid 18, which is a cover member for covering over the cooling water inlet 12 and the hydrogen inlet 14. The fuel lid 18 and the vehicle body with the connector receptor 40 disposed thereon respectively have a claw 19 and a catching element 17 at corresponding positions (see FIG. 4). The claw 19 is caught by the catching element 17 in the case of no fuel supply, so that the fuel lid 18 of the connector receptor 40 is closed.

The electric vehicle 10 of the embodiment has an opener lever located in the vicinity of the driver's sheet. The opener lever is electrically connected with the catching element 17 via a predetermined relay. An operational force applied to the opener lever is transmitted to the catching element 17, so as to release the engagement of the claw 19 with the catching element 17 and thereby open the fuel lid 18. The mechanism of transmitting the operational force applied to the opener lever is not restricted to the above electrical arrangement but may be a mechanical arrangement in which the opener lever is mechanically connected with the catching element 17 via a predetermined cable.

In the case of supply of hydrogen, the opener lever is operated to release the engagement of the claw 19 with the catching element 17 and open the fuel lid 18. The second connector 88 and the first connector 86 are respectively attached to the cooling water inlet 12 and the hydrogen inlet 14. The respective connectors are connected to the electric vehicle 10, and the controllers 50 and 150 communicating with each other output driving signals to open the solenoid valves of the respective joint elements. The opened state of the solenoid valves enables the supply of hydrogen from the hydrogen supply device 80 into the fuel tank 20 as well as the circulation of cooling water between the hydrogen supply device 80 and the electric vehicle 10. The controllers 50 and 150 respectively output driving signals to actuate the pumps 29 and 91, so that the flow of cooling water is circulated between the electric vehicle 10 and the hydrogen supply device 80. The temperature of cooling water rises, as the flow of cooling water passes through the heat exchange module 26 and cools down the fuel tank 20, which is heated up in the course of absorption of hydrogen by the hydrogen absorbing alloy. The temperature of cooling water is lowered, as the flow of cooling water passes through the heat exchange module 90 of the hydrogen supply device 80. In response to input of a signal from the hydrogen fill monitor 28 that detects conclusion of the supply of hydrogen, the controllers 50 and 150 respectively suspend actuation of the pumps 29 and 91 and close the solenoid valves of the joint elements, so as to stop the supply of hydrogen from the hydrogen supply device 80 into the fuel tank 20 as well as the circulation of cooling water between the hydrogen supply device 80 and the electric vehicle 10.

In the structure of this embodiment, the hydrogen supply device 80 has the heat exchange module 90. In the course of hydrogen supply, the flow of cooling water is circulated between the electric vehicle 10 and the hydrogen supply device 80 in order to cool the fuel tank 20 down. Any of other suitable structures may be applied for the same purpose. In one modified structure, the cooling water used to cool the fuel tank 20 down may be taken out of the electric vehicle and utilized for other applications as hot water having a certain quantity of heat, while the structure of the embodiment makes the cooling water circulated between the electric vehicle 10 and the hydrogen supply device 80 to be repeatedly cooled down in the hydrogen supply device 80. In this modified structure, a continuous supply of cooling water having sufficiently low temperature is externally fed to the electric vehicle during hydrogen supply.

(3) Control in Process of Hydrogen Supply

Figure 6:
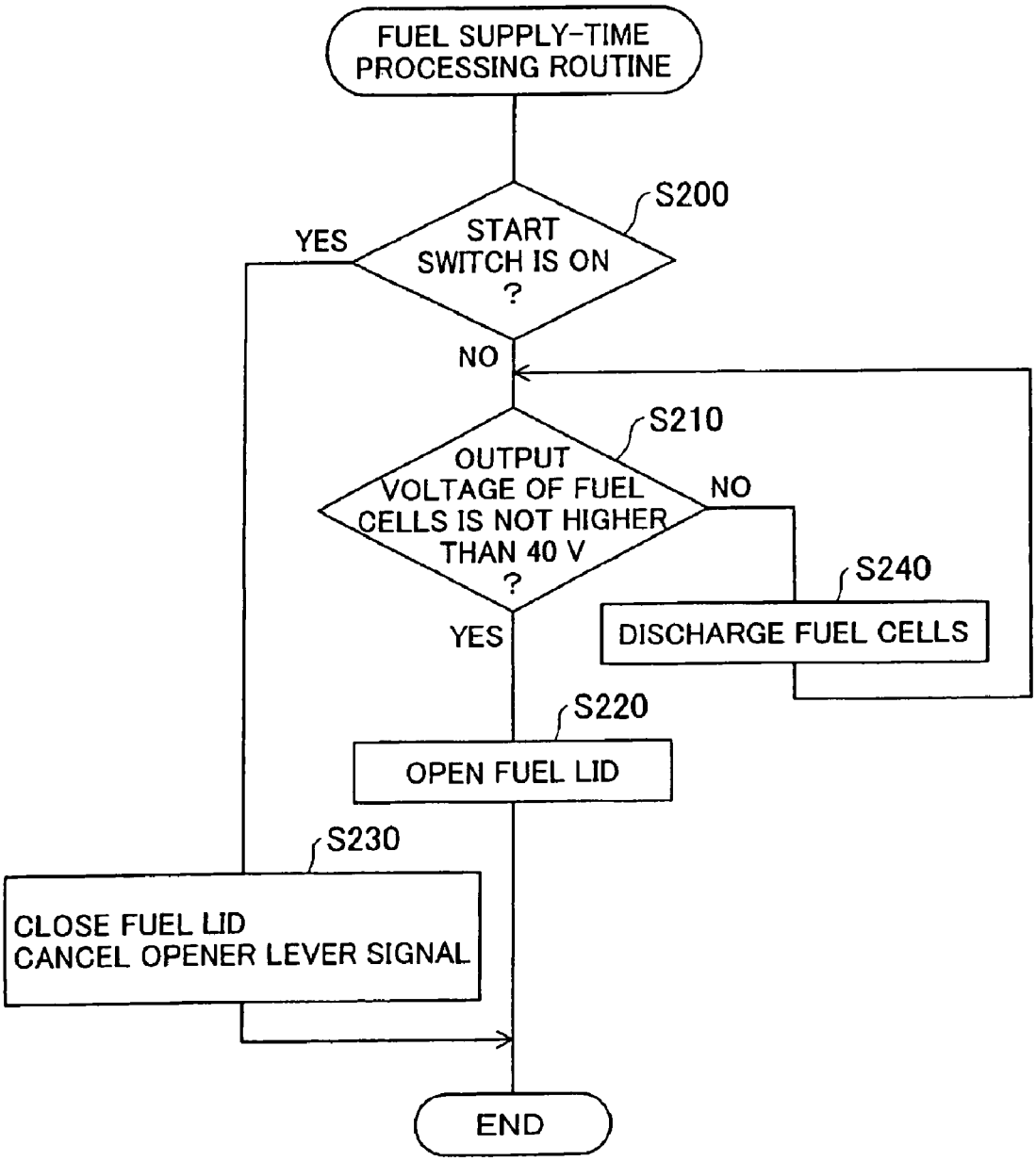
FIG. 6 is a flowchart showing a fuel supply-time processing routine.

The following describes a series of control carried out in the process of hydrogen supply to the electric vehicle 10. FIG. 6 is a flowchart showing a fuel supply-time processing routine executed in the process of supplying hydrogen to the electric vehicle 10. This routine is carried out by the controller 50 of the electric vehicle 10, when the user of the vehicle operates the opener lever to open the fuel lid 18, prior to the action of hydrogen supply to the electric vehicle 10.

When the program enters the routine, the CPU 52 of the controller 50 first determines whether or not a predetermined start switch is ON to give a starting instruction of the fuel cells 30 (step S200). The start switch corresponds to an ignition switch in a conventional vehicle with a gasoline engine mounted thereon, and is provided to allow input of the user's instructions of starting and stopping the operation of the fuel cells 30. When it is determined at step S200 that the start switch is ON, that is, when it is determined that the starting instruction of the fuel cells 30 has been given, the CPU 52 does not open the fuel lid 18 regardless of the user's operation of the opener lever and cancels input of a signal corresponding to the operation of the opener lever (step S230). The program then immediately exits from this routine. In this case, it is desirable to inform the user of the current situation that opening of the fuel lid 18 is not allowed because of the ON state of the start switch, for example, by a display at a preset position on the electric vehicle, an alarm, or a voice guidance.

When it is determined at step S200 that the start switch is OFF, on the other hand, the CPU 52 subsequently determines whether or not the output voltage of the fuel cells 30 is not higher than 40 V (step S210). As discussed previously, the voltage sensor 23 is attached to the fuel cells 30. The procedure of step S210 determines whether or not the output voltage of the fuel cells 30 is not higher than 40V based on a signal input from the voltage sensor 23. The determination of step S210 is carried out when it is determined at step S200 that the start switch is OFF, that is, when it is determined that operation of the fuel cells 30 is suspended. The determination of step S210 further enhances the safety in hydrogen supply. When the start switch is turned OFF to stop power generation in the fuel cells 30 and cease the gas supplies to the fuel cells 30, the output voltage of the fuel cells 30 does not immediately decrease from the ordinary state level of several hundred volts to substantially zero, but is gradually lowered until consumption of the remaining gases in the fuel cells 30. Confirmation that the output voltage of the fuel cells 30 is sufficiently small effectively prevents hydrogen supply under the condition of an undesired output from the fuel cells 30. The value used for the determination of step S210 is not restricted to 40 V, but may be any value suitable for confirmation that the output voltage from the fuel cells 30 is sufficiently small.

When it is determined at step S210 that the output voltage of the fuel cells 30 is not higher than 40V, the preset relay is coupled to open the fuel lid 18 (step S220). The program then exits from this routine.

When it is determined at step S210 that the output voltage of the fuel cells 30 is higher than 40V, on the other hand, the fuel cells 30 are discharged to lower the output voltage (step S240). In the electric vehicle 10 of the embodiment, a predetermined discharge resistance (not shown) is connectable with the fuel cells 30. The procedure of Step S240 connects the predetermined discharge resistance with the fuel cells 30 for a preset time period and accelerates power generation, which consumes the remaining gases in the fuel cells 30, so as to lower the output voltage of the fuel cells 30.

After the discharge of the fuel cells 30 at step S240, the program returns to step S210 to determine whether or not the output voltage is sufficiently lowered. The processing of steps S240 and S210 is repeated until the output voltage is lowered to or below 40 V. When the output voltage is sufficiently lowered by the discharge of the fuel cells, the program proceeds to step S220 to open the fuel lid 18 and then exits from this routine. In the above description, the fuel cells are connected with the predetermined discharge resistance and are discharged at step S240. An alternative procedure may not use the separate discharge resistance, but may connect the fuel cells with a predetermined device, which is mounted on the electric vehicle 10 and consumes electric power, to discharge the fuel cells.

In the fuel supply-time processing routine, when it is determined at step S200 that the start switch is not ON, the state of inputting the signal from the opener lever is maintained. This signal is cancelled in response to a subsequent closing action of the fuel lid 18. The catching element 17, which engages with the claw 19 of the fuel lid 18, has a specific sensor. When it is detected that the fuel lid 18 is closed and the claw 19 is caught by the catching element 17, the signal input from the opener lever is cancelled. The opening and closing state of the fuel lid 18 is thus specified by the detection that the signal from the opener lever is input or cancelled.

Figure 7:
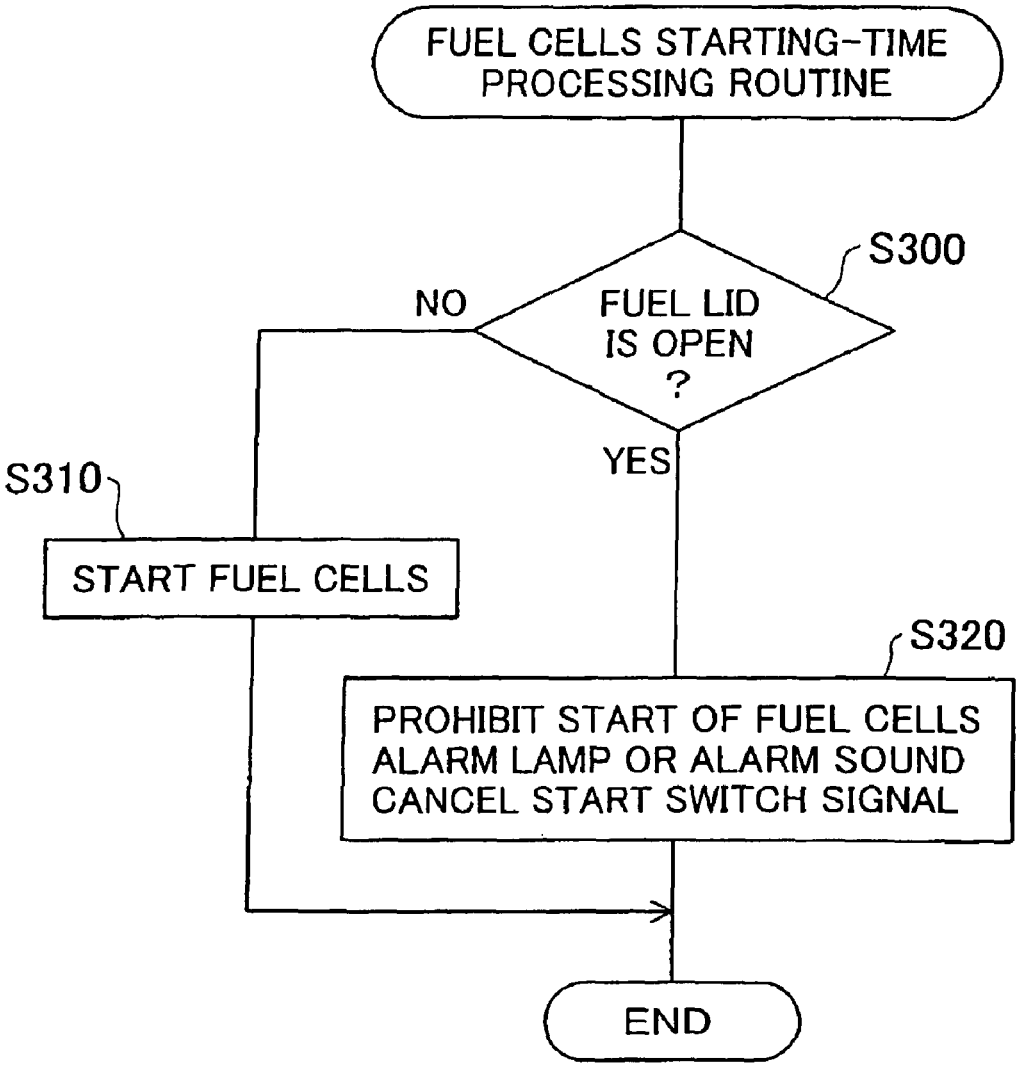
FIG. 7 is a flowchart showing a fuel cells starting-time processing routine.

The fuel supply-time processing routine shown in FIG. 6 is carried out to prevent supply of hydrogen during operation of the fuel cells. There is another series of processing executed to prevent operation of the fuel cells during supply of hydrogen. FIG. 7 is a flowchart showing a fuel cells starting-time processing routine carried out in the electric vehicle 10. This routine is executed by the controller 50 of the electric vehicle 10 when the user of the vehicle operates the start switch to start operation of the fuel cells 30.

When the program enters this routine, the CPU 52 of the controller 50 first determines whether or not the fuel lid 18 is open (step S300). When it is determined that the fuel lid 18 is closed, the program starts the fuel cells 30 (step S310) and exits from this routine. The start of the fuel cells here represents a start of sequential processes relating to the start of operation of the fuel cells 30, which include a process of heating the fuel tank 20 to extract hydrogen from the hydrogen absorbing alloy and starting a supply of the extracted hydrogen as the fuel gas to the fuel cells 30 and a process of actuating the compressor 60 and starting a supply of the compressed air as the oxidizing gas to the fuel cells 30.

When it is determined at step S300 that the fuel lid 18 is open, on the other hand, the CPU 52 prohibits the start of the fuel cells 30, lights up an alarm lamp or beeps an alarm sound in order to inform the user of the current situation that the operation of the fuel cells 30 is not allowed because of the opening state of the fuel lid 18, and cancels the signal input by the operation of the start switch (step S320). The program then exits from this routine. The arrangement of informing the user of the current situation is not restricted to lighting up the alarm lamp or beeping the alarm sound, but may apply any suitable structure.

The determination of step S300 regarding the opening and closing state of the fuel lid 18 is based on input of the signal by the operation of the opener lever. During execution of the fuel supply-time processing routine of FIG. 6 in response to the operation of the opener lever, it is determined that the fuel lid 18 is open even in the course of discharge of the fuel cells 30 at step S240 prior to the action of opening the fuel lid 18 at step S220.

In the electric vehicle 10 and the hydrogen supply device 80 of the embodiment discussed above, the fuel lid 18 is not opened in response to the operation of the opener lever, while the start switch is ON. This arrangement does not allow the hydrogen supply during operation of the fuel cells 30, thus enhancing the safety in hydrogen supply. Especially when the fuel cells are mounted on a movable body, such as the electric vehicle and are used as the driving energy source for movement, there is a possibility that the electric vehicle moves during operation of the fuel cells. The arrangement of the embodiment prohibits supply of hydrogen during operation of the fuel cells and thereby ensures no movement of the electric vehicle during supply of hydrogen, thus further enhancing the safety in hydrogen supply.

The procedure of the above embodiment determines at step S200 that the start switch for giving an instruction of starting the fuel cells is OFF and prevents movement of the electric vehicle during supply of hydrogen. The electric vehicle 10 of the embodiment may have setting of a specific drive mode where the electric vehicle 10 drives with electric power supplied from the secondary battery even while the fuel cells are stopped. In this modified structure, the process of step S200 in FIG. 6 determines whether or not the specific drive mode using the secondary battery as the driving energy source is not selected, in addition to the determination of whether or not the fuel cells are being operated. This modified arrangement effectively prevents movement of the electric vehicle during supply of hydrogen. The determination of step S200 may be based on another condition, as long as it is determined whether or not the electric vehicle is moving or is movable.

In the case where the output voltage of the fuel cells exceeds the predetermined value, the technique of the embodiment does not open the fuel lid 18 in response to the user's operation of the opener lever for hydrogen supply but prohibits a start of hydrogen supply, even when the start switch is OFF to give an instruction of stopping the operation of the fuel cells. This arrangement effectively prevents supply of hydrogen under the condition that the output voltage of the fuel cells exceeds the predetermined value and thus ensures the safety in hydrogen supply.

In the electric vehicle of the embodiment, while the fuel lid 18 is open, the start of the fuel cells is not allowed in response to the ON operation of the start switch. This arrangement effectively prevents the start of the fuel cells during supply of hydrogen and thus ensures the safety in hydrogen supply. The structure of prohibiting not only the start of the fuel cells but any movement of the vehicle including a drive using the secondary battery as the driving energy source in the opening state of the fuel lid 18 further enhances the safety in hydrogen supply.

Execution or non-execution of hydrogen supply is determined based on the opening and closing state of the fuel lid 18 at step S300 in the fuel cells starting-time processing routine of the embodiment described above. The determination regarding the execution of hydrogen supply may be based on another condition. One example is based on the communicable connection or disconnection of the controller 50 of the electric vehicle with or from the controller 150 of the hydrogen supply device 80. Another example is based on the input or non-input of a preset signal to give an instruction of starting hydrogen supply (that is, an instruction signal from a predetermined switch operated by the user to start the feed of hydrogen from the hydrogen supply device 80 and to start the circulation of cooling water). The determination based on the opening and closing state of the fuel lid 18 as executed in the above embodiment can determine execution or non-execution of hydrogen supply prior to connection of the hydrogen flow path between the hydrogen supply device 80 and the electric vehicle 10, thus ensuring the enhanced safety.

In the structure of the embodiment, once the opener lever is operated to execute the fuel supply-time processing routine, even when the output voltage of the fuel cells exceeds the predetermined value and opening of the fuel lid 18 is not allowed at the time of operating the opener lever, discharge of the fuel cells is repeatedly carried out to lower the output voltage and eventually allow opening of the fuel lid 18. In a modified structure, when the output voltage of the fuel cells exceeds the predetermined value (40 V in the embodiment) at the time of operating the opener lever, the procedure may exit from the processing routine only after connection of the fuel cells with the discharge resistance and reset of the input signal by the operation of the opener lever, while requiring another operation of the opener lever to open the fuel lid 18. In this structure, a display at a preset position or an alarm is desirable to inform the user of the current situation that the output voltage of the fuel cells is undesirably high and opening of the fuel lid 18 is thus not allowed. This procedure resets the input signal by the operation of the opener lever simultaneously with the discharge operation. When the start switch is turned ON to execute the fuel cells starting-time processing routine of FIG. 7 prior to another operation of the opener lever, it is determined at step S300 that the fuel lid 18 is not open.

In the fuel supply-time processing routine of the embodiment described above, when it is determined that the fuel cells are in operation, the procedure does not allow the fuel lid 18 to be opened in response to the operation of the opener lever, so as to prohibit the start of hydrogen supply. One modified procedure does not allow the solenoid valves of the respective joint elements to be opened in the ON state of the start switch (that is, during operation of the fuel cells), so as to prohibit the start of hydrogen supply, even after the fuel lid 18 is opened by the operation of the opener lever and the connector is attached to the connector receptor.

In the fuel supply-time processing routine of the embodiment described above, opening of the fuel lid 18 is not allowed even in the OFF state of the start switch, until the output voltage of the fuel cells is lowered to or below the predetermined value. Another arrangement may be applied to prohibit the start of hydrogen supply when the output voltage of the fuel cells exceeds the predetermined value. One applicable procedure opens the fuel lid 18 to enable attachment of the connector in the OFF state of the start switch, in response to the operation of the opener lever. Even after attachment of the connector to the connector receptor and input of a predetermined instruction of starting hydrogen supply, the controllers 50 and 150 are stood by until the output voltage of the fuel cells is lowered to or below the predetermined value. Only after the output voltage of the fuel cells is lowered to or below the predetermined value, opening of the solenoid valves and actuation of the pumps are allowed to start the supply of hydrogen. This arrangement improves the convenience of operation in hydrogen supply. The user who wants to supply hydrogen is not required to wait for conclusion of discharge of the fuel cells and permission to open the fuel lid 18, when the output voltage of the fuel cells exceeds the predetermined value. Before the sufficient decrease in output voltage of the fuel cells, the user may complete the series of operations relating to start of hydrogen supply, which include connection of the hydrogen supply device 80 with the electric vehicle 10 through attachment of the connector to the connector receptor and input of the predetermined instruction of starting hydrogen supply. In this structure, a display at a preset position or an alarm is required in at least one of the electric vehicle 10 and the hydrogen supply device 80 to inform the user of the stand-by status for a time period between attachment of the connector and an actual start of hydrogen supply (that is, a time period when the output voltage of the fuel cells is lowered to or below the predetermined value).

In the fuel cells starting-time processing routine of FIG. 7, when it is determined at step S300 that the fuel lid 18 is open, the procedure prohibits the start of the fuel cells and cancels the operation of the start switch. One modified procedure does not exits from this routine but returns to step S300 after the processing of step S320, which prohibits the start of the fuel cells and lights up the alarm lamp or beeps the alarm sound. The procedure proceeds to step S310 to start the fuel cells when the fuel lid 18 is closed after conclusion of hydrogen filling.

The structures of the electric vehicle 10 and the hydrogen supply device 80 of the above embodiment may be modified in various ways. For example, in the structure of the above embodiment, the hydrogen supply device 80 feeds a supply of hydrogen to the electric vehicle 10, while making the flow of cooling water circulated between the hydrogen supply device 80 and the electric vehicle 10. One possible modification may use a separate device for circulation of cooling water from the hydrogen supply device 80. A cooling unit for cooling the fuel tank 20 down in the course of hydrogen supply (this corresponds to the heat exchange module 90 built in the hydrogen supply device 80 in the above embodiment) may be mounted on the electric vehicle 10. In the structure of the above embodiment, the first connector 86 and the second connector 88 are attached to the connector receptor 40, which is opened and closed with the fuel lid 18, the single cover member, to allow supplies of hydrogen and cooling water to the electric vehicle 10. In one modified structure, the connector for hydrogen supply and the connector for cooling water supply may be attached to different connector receptors disposed at separate locations. In another modified structure, a single connector is attached to the electric vehicle 10 to connect both the flow paths of hydrogen and cooling water between the electric vehicle 10 and the hydrogen supply device 80. The solenoid valve attached to the hydrogen flow path joint element 96 to open and close the flow path of supplying hydrogen from the hydrogen supply device 80 to the electric vehicle may be located at a different position, that is, at an arbitrary position in the hydrogen gas inlet conduit 97. The fuel tank 20 may store hydrogen by any suitable means other than absorption of hydrogen in the hydrogen absorbing alloy.

(4) Another Construction of Electric Vehicle

The electric vehicle 10 of the embodiment described above has the fuel tank 20 including the hydrogen absorbing alloy, which absorbs hydrogen therein for storage. The technique of the present invention is also applicable to an electric vehicle with a different fuel mounted thereon. The electric vehicle has a fuel tank for storing therein a hydrocarbon or a hydrocarbon compound, instead of hydrogen, as the fuel and is further provided with a system that reforms the fuel (source material) and produces hydrogen. A variety of hydrocarbons and hydrocarbon compounds including gas fuels like natural gas (methane) and liquid fuels like alcohols and gasoline may be used for the source material to produce hydrogen. The system for producing hydrogen from the source material may include a reformer device that utilizes a noble metal catalyst to accelerate a steam reforming reaction and a partial oxidation reaction and obtain a hydrogen rich gas from the source material and a carbon dioxide reduction device that utilizes a carbon monoxide selective oxidation catalyst to reduce the concentration of carbon monoxide included in the hydrogen rich gas.

The technique of the present invention is also applicable for such construction to supply the source material to the fuel tank of the electric vehicle. In a similar manner to that of the embodiment discussed above, the technique prohibits a start of operation of the fuel cells during supply of the source material or a start of supply of the source material during operation of the fuel cells, thus enhancing the safety in supply of the source material.

The above embodiment regards the application of the invention to the vehicle. The technique of the present invention is applicable to a diversity of movable bodies that utilize the output from the fuel cells for movement, such as ships, boats, aircraft, and other flying objects as well as vehicles.

The above embodiment of the present invention and its application are to be considered in all aspects as illustrative and not restrictive. There may be many modifications, changes, and alterations without departing from the scope or spirit of the main characteristics of the present invention.

INDUSTRIAL APPLICABILITY

The fuel supply system for fuel cells according to the present invention is suitably applied for diverse movable bodies with fuel cells mounted thereon, such as vehicles, to supply a fuel for the fuel cells.

What is claimed is:

1. A fuel supply system for fuel cells, which functions to supply either one of a fuel for said fuel cells and a source material used to generate the fuel for said fuel cells, said fuel supply system comprising:

said fuel cells;

a storage module that is connected to said fuel cells and stores either one of the fuel and the source material therein;

a supply module that connects with said storage module to supply either one of the fuel and the source material to said storage module;

a fuel cells working status specification module that determines whether or not said fuel cells are in a power generation state; and a supply prohibition module that, when said fuel cells working status specification module determines that said fuel cells are in the power generation state, prohibits a start of the supply of either one of the fuel and the source material from said supply module to said storage module; and an input module that receives an instruction of starting operation of said fuel cells and an instruction of stopping the operation of said fuel cells, wherein said fuel cells working status specification module determines that said fuel cells are in the power generation state when the instruction of starting the operation of said fuel cells is given to said input module but no instruction of stopping the operation of said fuel cells is subsequently given to said input module.

2. A fuel supply system for fuel cells in accordance with claim 1, wherein said storage module comprises a fuel lid which opens when either one of the fuel and the source material is supplied, and wherein said supply prohibition module prohibits said fuel lid from opening when said fuel cells working status specification module determines that said fuel cells are in the power generation state.

3. A fuel supply system for fuel cells in accordance with claim 1, said fuel supply system further comprising:

a voltage detection module that measures an output voltage of said fuel cells, wherein said supply prohibition module prohibits the start of the supply of either one of the fuel and the source material when the output voltage measured by said voltage detection module is not less than a predetermined level, while said fuel cells working status specification module determines that said fuel cells are not in the power generation state.

4. A fuel supply system for fuel cells in accordance with any one of claim 1 or 3, wherein said storage module stores hydrogen as the fuel for said fuel cells and includes a hydrogen absorbing alloy for the storage of hydrogen.

5. A fuel supply system for fuel cells in accordance with any one of claim 1 or 3, wherein said fuel cells and said storage module are mounted on a movable body, which utilizes electrical energy produced by said fuel cells as driving energy for movement.

6. A movable body with fuel cells mounted thereon, said movable body utilizing electrical energy produced by said fuel cells as a driving energy source for movement, said movable body comprising:

a storage module that is connected to said fuel cells and stores therein either one of a fuel for said fuel cells and a source material used to generate the fuel for said fuel cells;

a fuel cells working status specification module that determines whether or not said fuel cells are in a power generation state;

a supply prohibition module that, when said fuel cells working status specification module determines that said fuel cells are in the power generation state, prohibits a start of supply of either one of the fuel and the source material from a predetermined supply device, which is disposed outside said movable body for supplying either one of the fuel and the source material, to said storage; and an input module that receives an instruction of starting operation of said fuel cells and an instruction of stopping the operation of said fuel cells, wherein said fuel cells working status specification module determines that said fuel cells are in the power generation state when the instruction of starting the operation of said fuel cells is given to said input module but no instruction of stopping the operation of said fuel cells is subsequently given to said input module.

7. A movable body in accordance with claim 6, wherein said storage module comprises a fuel lid which opens when either one of the fuel and the source material is supplied, and wherein said supply prohibition module prohibits said fuel lid from opening when said fuel cells working status specification module determines that said fuel cells are in the power generation state.

8. A movable body in accordance with claim 6, said movable body further comprising:

a voltage detection module that measures an output voltage of said fuel cells, wherein said supply prohibition module prohibits the start of the supply of either one of the fuel and the source material when the output voltage measured by said voltage detection module is not less than a predetermined level, while said fuel cells working status specification module determines that said fuel cells are not in the power generation state.

9. A movable body in accordance with any one of claim 6 or 8, said movable body further comprising:

another energy source that is different from said fuel cells and generates driving energy for movement of said movable body; and an actuation prohibition decision module that determines whether or not actuation of said another energy source is prohibited, wherein said supply prohibition module prohibits the start of the supply of either one of the fuel and the source material to said storage module when said actuation prohibition decision module determines that actuation of said another energy source is not prohibited, in addition to when said fuel cells working status specification module determines that said fuel cells are in the power generation state.

10. A fuel supply control method that controls a process of supplying either one of a fuel for fuel cells and a source material used to generate the fuel for said fuel cells, said fuel supply control method comprising the steps of:

(a) determining whether or not said fuel cells are in a power generation state; and (b) when it is determined at said step (a) that said fuel cells are in the power generation state, prohibiting a start of the supply of either one of the fuel and the source material to a storage module, which is arranged with said fuel cells and stores either one of the fuel and the source material, wherein it is determined that said fuel cells are in the power generation state when an instruction of starting the operation of said fuel cells is given but no instruction of stopping the operation of said fuel cells is subsequently given.

*11. A fuel supply system for fuel cells mounted on a movable body, which functions to supply either one of a fuel for the fuel cells and a source material used to generate the fuel for the fuel cells, the fuel supply system comprising:*

*a storage module that stores either one of the fuel and the source material therein;*

*a supply module that connects with the storage module to supply either one of the fuel and the source material to the storage module;*

*a fuel filling status specification module that determines whether or not either one of the fuel and the source material is being supplied from the supply module to the storage module; and*

*a power generation prohibition module that prohibits power generation by the fuel cells and informs a user of the prohibition of power generation of the fuel cells when the fuel filling status specification module determines that either one of the fuel and the source material is being supplied.*

*12. The fuel supply system of claim 11, wherein the fuel filling status specification module determines whether or not either one of the fuel and the source material is being supplied from the supply module based on a communication between the supply module and the fuel filling status specification module.*

*13. A fuel supply system for fuel cells mounted on a movable body, which functions to supply either one of a fuel for the fuel cells and a source material used to generate the fuel for the fuel cells, the fuel supply system comprising:*

*a storage module that stores either one of the fuel and the source material therein;*

*a supply module that connects with the storage module to supply either one of the fuel and the source material to the storage module;*

*a fuel filling status specification module that determines whether or not either one of the fuel and the source material is being supplied from the supply module to the storage module; and*

*a movement prohibition module that prohibits movement of the movable body when the fuel filling status specification module determines that either one of the fuel and the source material is being supplied.*

*14. The fuel supply system of claim 13, further comprising:*

*a movement status specification module that determines whether or not the movable body is movable; and*

*a fuel filling prohibition module that prohibits supply of either one of the fuel and the source material from the supply module to the storage module when the movement status specification module determines that the movable body is movable.*

*15. A method of controlling operation of a vehicle comprising fuel cells, a storage module for storing a fuel for the fuel cells or a source material used to generate the fuel for the fuel cells, and a supply module for supplying the fuel or the source material from a supply device to the storage module, the method comprising:*

*determining that the supply module is in a state that would permit the fuel or the source material to be supplied to the storage module;*

*prohibiting operation of the fuel cells in response to the determination that the supply module is in a state that*

*would permit the fuel or the source material to be supplied to the storage module; and*

*informing a user of the vehicle that the supply module is in a state that would permit the fuel or the source material to be supplied to the storage module and that operation of the fuel cells has been prohibited in response to the determination that the supply module is in a state that would permit the fuel or the source material to be supplied to the storage module.*

* * * * *